United States Patent [19]

Kobayashi

[11] 4,080,071

[45] Mar. 21, 1978

[54] EXPOSURE DEVICE OF A COPYING MACHINE

[75] Inventor: Tatsuo Kobayashi, Ebina, Japan

[73] Assignee: Rank Xerox Ltd., London, England

[21] Appl. No.: 689,292

[22] Filed: May 24, 1976

[30] Foreign Application Priority Data

Sep. 9, 1975 Japan .......................... 50-123443[U]

[51] Int. Cl.[2] ............................................ G03B 27/62

[52] U.S. Cl. .................................... 355/75; 355/3 R; 355/14

[58] Field of Search ..................... 355/3 R, 14, 74, 75, 355/8

[56] References Cited

U.S. PATENT DOCUMENTS

| | | | |
|---|---|---|---|
| 3,671,121 | 6/1972 | Albert | 355/3 R X |
| 3,724,942 | 4/1973 | Gibson et al. | 355/3 R |
| 3,751,155 | 8/1973 | Liechty | 355/14 X |
| 3,792,913 | 2/1974 | Simmons | 355/74 X |

*Primary Examiner*—Richard A. Wintercorn

*Attorney, Agent, or Firm*—James J. Ralabate; Clarence A. Green; William A. Henry, II

[57] ABSTRACT

An exposure device for a copying machine that has a transparent platen includes a pair of reflecting members covering the end areas of the platen. The reflectors are movable according to the size of paper placed into the copying machine so as to increase or decrease the covering areas whereby the effective coverage area of the platen is made to coincide with the size of copy paper fed into the copying machine.

3 Claims, 2 Drawing Figures

EXPOSURE DEVICE OF A COPYING MACHINE

BACKGROUND OF THE INVENTION

This invention relates to an exposure device for copying machines, and more particularly to such an exposure device for use in an electrophotographic copying machine in which an original document to be reproduced is placed upon a transparent support platen with the original being scanned from below a moving light source for effecting exposure by reflecting light rays.

Electrophotographic copying machines, generally, consist of a cylindrical metallic light-sensitive member coated on its surface with a photosensitive or photoconductive material, a charging device for sensitizing the light sensitive member, an exposure device for dissipating in part the electrostatic charge placed upon the surface of the light system member to form a pattern of charge in conformity with the original image, a developing device for developing the charge pattern with a developing material including a resinous powder (to be referred to hereinafter as toner) capable of being attracted by the electrostatic attraction of the charge, a transfer device for transferring the toner image formed on the light sensitive member onto an image receptor such as paper, a fixing device for permanently fixing the toner image onto the image receptor, and a cleaning device for removing the excess toner remaining on the surface of a light sensitive member after transfer.

In copying machines having the above described construction, where a photo-positive original which is most frequently used is reproduced, the parts of charge corresponding to the characters and drawings remain after exposure on the surface of the light sensitive member, and other parts of charge corresponding to the background, i.e., the white areas of the original, are dissipated by the exposure. In the developing step, the charge remaining in the form of characters and drawings is developed with the toner charged and an opposite polarity to that of the latent image so as to form a toner image.

In copying machines that accommodate originals of various sizes, it is often convenient or desirable to effect copying without covering the support platen with the platen cover when the number of originals is large and a copy is required for each original or copying is to be effected quite hurriedly.

For example, when copying is effected with a platen cover 1 open as illustrated in FIG. 1 to make a copy of an original 2 which is smaller in size than the exposure area, the light rays projected from the exposure lamps onto the areas surrounding the original 2 will be reflected neither by the original nor by the platen cover 1 so that the charge 4 on the corresponding areas of the light sensitive member will remain undissipated. As a result, the remaining charge 4 will attract toner in development station 5. This is more conspicuous in a copying machine wherein an improved development system of high performance is used which is capable of reproducing with high fidelity half-tones and solid-block area photographs. In such an improved copying machine, a copy 6 with a black frame is obtained if the image receptor is larger than the original. On the other hand, where the dimension of the image receptor is substantially the same or smaller than that of the original, the toner 7 attracted to the parts of the light system member corresponding to the areas surround the original is not transferred onto the image receptor and will likely cause various undesirable phenomenon, that is, an increase in toner consumption, an increase in the load against a cleaning device 8, and smudging of machine parts and the like.

It is therefore an object of the present invention to overcome the above described disadvantages by providing an exposure device with light reflectors.

It is yet another object of the present invention to provide an exposure device for use in a copying machine with light reflectors at the ends of a support platen capable of being moved according to the sizes of copy paper being used so as to cover the ends of the support platen.

SUMMARY OF THE INVENTION

In a copying machine having a platen, a means to expose an original from said platen to a photosensitive member, said means to expose the original including at least one lamp and reflector means, an improvement is disclosed comprising control means for positioning said reflector means so as to increase or decrease coverage areas of said platen whereby the effective surface area of the platen is made to coincide with the size of copy paper received in said copying machine.

BRIEF DESCRIPTION OF THE DRAWINGS

For a better understanding of the invention as well as other objects and further features thereof, reference is had to the following detailed description of the invention to be used in conjunction with the accompanying drawings, wherein.

DESCRIPTION OF THE PREFERRED EMBODIMENT

Figure 1:
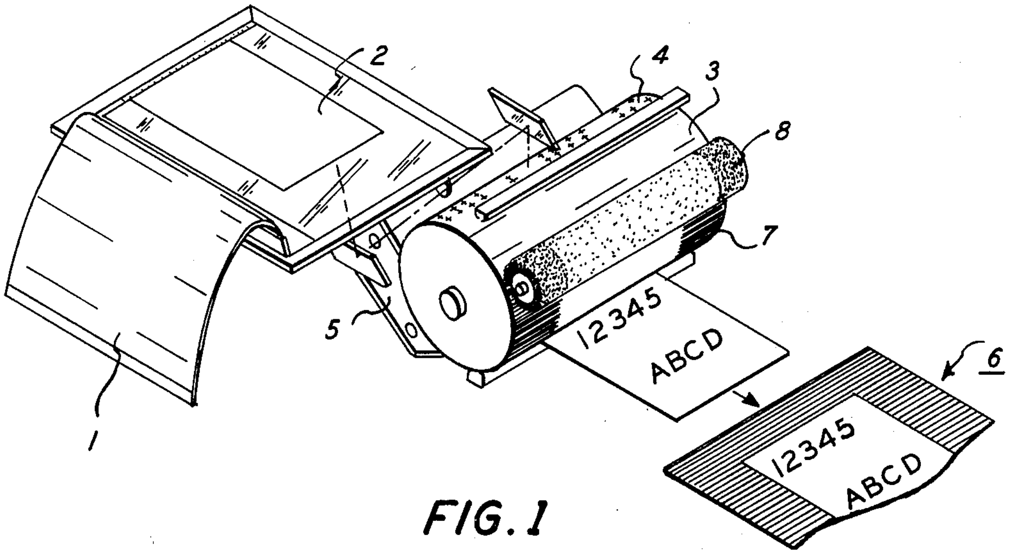
FIG. 1 is a perspective view illustrating the disadvantages of the conventional exposure device.
Figure 2:
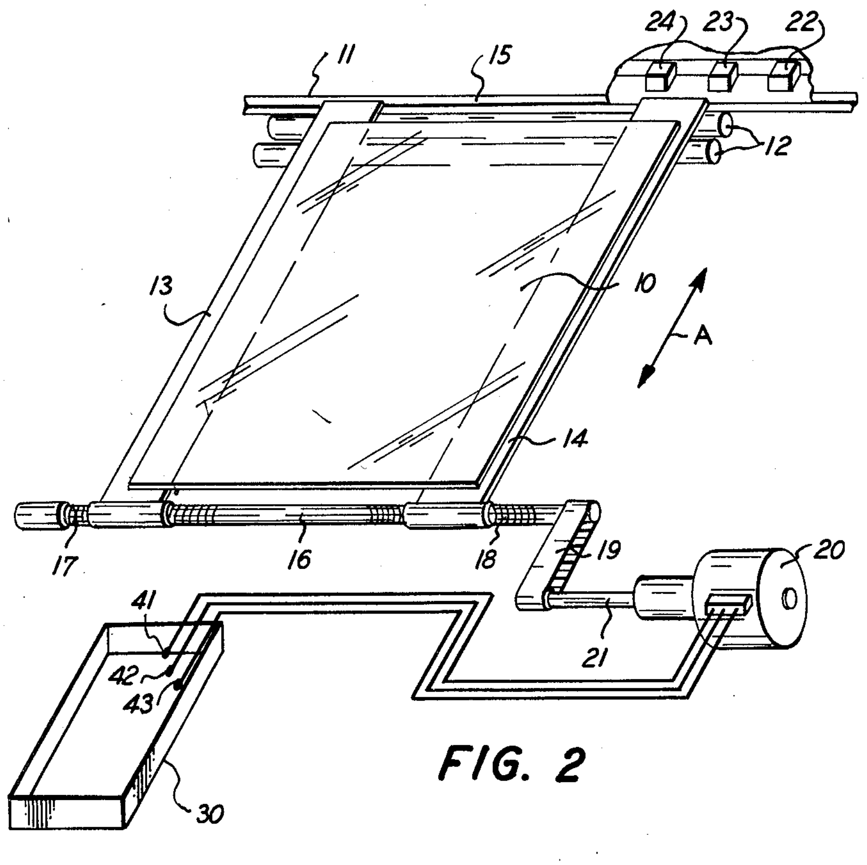
FIG. 2 is a perspective view of an embodiment of the present invention.

The invention will now be described with reference to the embodiment illustrated in FIG. 2. In the drawing, there is shown a transparent support platen 10 secured to a machine frame 11. A plural number of exposure lamps 12 are supported reciprocably below the platen 10 for back-and-forth movement in the direction of an arrow A.

A pair of light reflecting members 13 and 14 are supported beneath the support platen one adjacent either lateral end thereof, with an end of the reflecting members bearing slidably against a guide groove 15 formed in the machine frame 11, and the other end thereof being in a meshing engagement with a right-handed screw 17 and a left-handed screw 18 provided on a drive shaft 16 mounted rotatably to the frame 11.

The drive shaft 16 is mechanically connected through an endless belt 19 to a drive shaft 21 of a power source 20 such as an electric motor, so that when the drive shaft 21 rotates in one direction or the other, the light reflectors 13 and 14 are brought to approach or, alternatively, spaced apart from each other.

A drive signal is fed to the power source 20 from paper input tray 30 in accordance with the width of the sheets of copy paper placed in the copying machine so as to displace the light reflectors 13 and 14 until they are brought into contact with one of the first, second and third limit switches 22, 23, and 24 which are placed in positions conforming with the width of the particular sheets being used whether ordinary 8½ by 11, 9 × 14, or any other size one desires to use. Upon contact with any one of the selected limit switches, the power source stops and the reflectors also stop in their proper positions.

The construction means for detecting the kinds or sizes or copy paper placed in the machine may vary according to the type of copying machine employed, for example, an input tray 30 could be employed that would include sensors or switches 41, 42 and 43 that would be be activated once a particular width of paper is inserted therein. In the case of a copying machine wherein a sheet tray includes three side plates arranged in a C-shaped configuration and movable in conformity with the copy paper of any selected size, the size of the sheets may be detected by the position of these side plates.

If the copying machine is adapted to be equipped with a selected one of a series of cartridge trays specifically designed to receive different sizes of copy paper, the kinds of sheets may be detected by the particular cartridge tray set in the machine. In case of a copying machine which is provided with a plural number of copy paper feeding devices one of which is automatically selected by push-button operation so as to be placed in a copying position, the push-button operation may also be used for the detection of the kinds of copy paper.

When sheets of copy paper of a particular size are placed in position in the copying machine, a detecting signal issues and drives the power source 20. Power source 20 causes to rotate the drive shaft 16 to the drive shaft 21 and the endless belt 19, so that the reflectors 13 and 14 being in a screwed engagement with the right-handed screw 17 and left-handed screw 18 are moved to be spaced apart from each other or, alternatively, to approach each other along the guide groove 15 provided on the machine frame 11. When the light reflector 14 contacts the third limit switch 24 to turn it on, the power source 20 stops and the reflectors 13 and 14 also stop at their position corresponding to the width of the paper previously selected.

With the reflectors in such positions, the start button is pressed down to illuminate and move the exposure lamps 12. The light rays projected to the end areas of the original will be reflected by the reflectors 13 and 14 and reach without failure to the light sensitive member 3. Thus, the charge placed at the ends of the sensitive member is dissipated thereby avoiding end area development with black toner.

As the exposure device of the present invention has been described, the light reflectors 13 and 14 are displaced in accordance with the size of sheets of copy paper placed in the copying machine so as to increase or decrease covered or sheeted areas at the ends of the support platen 10 whereby the effective surface area of the platen (i.e., the area not covered by the reflectors 13 and 14) is made to coincide with the size of the copy paper received in the copying machine.

As a result, the exposure light rays projected onto the end areas of the platen are reflected by the reflectors to be thrown back to the light system member thereby preventing the end areas of the sensitive member from being developed with toner, yet avoiding smudging of the machine parts and unnecessary consumption of toner. The device of the present invention will be more effective if it is employed in a copying machine in which the exposure lamps are designed to move only in a lamp path corresponding to the longitudinal length of the original.

In addition to the apparatus outlined above, many other modifications and/or additions to this invention will be readily apparent to those skilled in the art upon reading this disclosure and these are intended to be encompassed in the invention disclosed and claimed herein.

What is claimed is:

1. In a copying machine having platen, a means to expose an original from said platen to a photosensitive member, said means to expose the original including at least one lamp and a pair of reflectors, the improvement comprising;
   - detection means for producing a signal in response to the size of paper placed in the copying machine, control means for positioning said reflectors so as to increase or decrease coverage areas of said platen, said control means comprising a motor and screw means drivingly connected to said reflectors whereby rotation of said screw means by said motor positions said reflectors, said signal from said detection means being used to actuate said control means whereby said reflectors change positions in response thereto, and means to limit positioning of said reflectors whereby the effective surface area of the platen is made to coincide with the size of copy paper received in said copying machine.

2. An exposure device for use in a copying machine comprising:
   - a transparent platen for supporting an original thereon;
   - a plurality of exposure lamps adapted for reciprocating movement adjacent said platen;
   - a pair of light reflecting members covering the end areas of said platen;
   - means for moving said light reflecting members so as to increase or decrease the covering areas by said members; and means for driving said moving means by detecting the size of sheets of copy paper set in the copying machine.

3. The copying apparatus of claim 2 wherein said means for moving said light reflecting members comprises a motor and a shaft with said shaft having right hand and left hand screws thereon, said shaft being drivingly connected to said motor and said reflector members.

* * * * *